United States Patent [19]

Obaraki et al.

[11] Patent Number: 5,408,969
[45] Date of Patent: Apr. 25, 1995

[54] SYSTEM FOR DETECTING ABNORMALITIES

[75] Inventors: Toshikazu Obaraki, Susono; Naoto Kushi, Toyota, both of Japan

[73] Assignee: Toyota Jidosha Kabushiki Kaisha, Toyota, Japan

[21] Appl. No.: 178,751

[22] Filed: Jan. 7, 1994

[30] Foreign Application Priority Data

Jan. 14, 1993 [JP] Japan .................................. 5-022176

[51] Int. Cl.$^6$ ............................................. F02D 9/00
[52] U.S. Cl. ...................................... 123/336; 123/337
[58] Field of Search .............. 123/336, 436, 437, 438, 123/675, 683, 688, 442, 478, 337, 331, 350, 579, 489; 73/112, 116, 118.1; 364/424.1, 431.01, 426.02

[56] References Cited

U.S. PATENT DOCUMENTS

| | | | |
|---|---|---|---|
| 4,391,249 | 7/1983 | Bianchi et al. | 123/438 |
| 4,452,218 | 6/1984 | Yokoyama et al. | 123/579 |
| 4,462,357 | 7/1984 | Lockhart | 123/336 |
| 4,462,367 | 7/1984 | Tanabe et al. | 123/442 |
| 4,995,364 | 2/1991 | Kamei et al. | 123/442 |
| 5,065,728 | 11/1991 | Nakinawa | 123/489 |
| 5,124,922 | 6/1992 | Akiyama | 364/426.02 |
| 5,151,861 | 9/1992 | Danno et al. | 364/426.02 |
| 5,220,828 | 6/1993 | Sodeno et al. | 73/118.1 |
| 5,263,453 | 11/1993 | Wakahara et al. | 123/436 |
| 5,278,760 | 1/1994 | Ribbens et al. | 364/424.1 |

FOREIGN PATENT DOCUMENTS 62-91644 4/1987 Japan .
63-113155 5/1988 Japan .

Primary Examiner—Raymond A. Nelli
Attorney, Agent, or Firm—Oblon, Spivak, McClelland, Maier, & Neustadt

[57] ABSTRACT

A novel device of the present invention detects an abnormal driving condition where a sub-throttle valve pressed in a full-opening direction by means of a spring is abruptly driven in the full-opening direction due to an abnormal condition of an actuator, and controls an internal combustion engine according to the requirements. A difference DLTA in an opening TA of a sub-throttle valve 34 within a preset time period is determined (steps S100 through S130) and then compared with a predetermined range allowing to be driven by a stepping motor 32 (step S140). The sub-throttle valve 34 is pressed in a full-opening direction by means of a spring 54. In case of a step-out of the stepping motor 32, the sub-throttle valve 34 is abruptly driven in a full-closing direction by the spring 54. When an abrupt change of the sub-throttle valve 34 is detected, a process under abnormal conditions (abnormality process) including reduction of fuel injection is implemented (step S160). However, when a manifold negative pressure is not abruptly changed while an abnormal condition of the stepping motor 32 is detected, the abnormality process may not be executed since no abrupt variation in the air intake is expected. When an abrupt change in the manifold negative pressure is detected, on the other hand, an ISC valve is closed to compensate for the abrupt change.

12 Claims, 9 Drawing Sheets

SYSTEM FOR DETECTING ABNORMALITIES

BACKGROUND OF THE INVENTION

1. Field of the Invention

The present invention relates to a device for detecting an abnormal condition of an actuator or a sensor. More specifically, the invention pertains to a device for regulating an air intake into an internal combustion engine, a device for controlling an amount of fuel injection in the internal combustion engine, and respective methods.

2. Description of the Related Art

In an internal combustion engine, a throttle valve is generally installed in an air intake conduit for adjusting an air intake and driven by accelerator with wire link. A structure which the throttle valve is driven by an actuator like a motor is proposed recently as a linkless throttle valve. For the improved reliability, such a structure preferably includes a mechanism for pressing a throttle valve in a fail-safe direction under an abnormal condition of a driving system or a device for detecting abnormality of an actuator. In description of the specification, the actuator represents a whole system for driving a throttle valve including a driving source such as a motor and a power transmission mechanism.

A prior art structure is described according to an exemplified link-less throttle where a throttle valve for controlling an air intake in an internal combustion engine by a stepping motor (actuator). FIG. 1 schematically shows an electronically controlled throttle for controlling an opening of a throttle valve TV disposed in an air intake system of an internal combustion engine by means of an actuator. A first electronic control unit EC1 detects a driver's operation of an accelerator AC with a sensor, determines a target opening $\alpha$ of the throttle valve TV based on a variety of data including a rotation speed of the internal combustion engine and a vehicle speed, detects an actual opening $\theta$ of the throttle valve TV with a throttle opening sensor SS, and drives the actuator AA to make the actual opening $\theta$ of the throttle valve TV equal to the target opening $\alpha$. Such an electronically controlled throttle is generally used for restricting an output of the internal combustion engine and attaining a linearity of an operation of the accelerator to an output of the internal combustion engine.

In this conventional system, an amount of fuel injection in an internal combustion engine is determined by a second electronic control unit EC2 for electrically opening and closing a fuel injection valve. The amount of fuel injection is determined according to operating conditions of the internal combustion engine, more specifically to an air intake into the internal combustion engine.

In these electronically controlled throttles, abnormality in the actuator directly causes abnormality in the opening of the throttle valve or the output of the internal combustion engine. It is thus essential to detect such abnormality without delay. The throttle valve is generally pressed in a full-closing direction by means of a spring to be controlled for ensuring safety under an abnormal condition of the actuator. A prior art device detects a rotation speed of a throttle valve and determines that the throttle valve is forcibly rotated by means of a spring or the like to cause abnormality such as step-out of a stepping motor when the rotation speed exceeds an upper limit of a driving speed of the throttle valve by an actuator as disclosed in JAPANESE PATENT LAYING-OPEN GAZETTE No. 62-93442 'CONTROL DEVICE FOR OPENING AND CLOSING THROTTLE VALVE'.

Such a conventional throttle valve control device is only directed to a single throttle valve structure and not applicable to a dual throttle valve structure. A conventional system can not be applied to the dual throttle valve structure where a second throttle valve is disposed in series with a first throttle valve directly driven by an accelerator since the second throttle valve is generally pressed in a full-opening direction and an air intake is substantially not affected by the movement of the second throttle valve having an opening greater than that of the first throttle valve.

In the conventional throttle valve control device, existence of abnormality is determined according to a target position and an actual position of the throttle valve. Both a target opening $\alpha$ and an actual opening $\theta$ are consequently input as comparable signals into an electronic control unit for executing abnormality detection. This makes the structure of the throttle valve control device undesirably complicated. When a plurality of electronic control units intercommunicate data representing the opening of the throttle valve, abnormality in the actuator can not be discriminated from abnormality in a communication system.

Abnormality in the actuator resulting in abnormal operation of the throttle valve drastically varies the output of the internal combustion engine which gives uncomfortable feeling and uneasiness to a driver. Such abnormality should thus be detected without delay. A relatively long time is, however, required for abnormality detection when data are input through communication. In a structure that a throttle valve is pressed in a fail-safe direction, an electronically controlled throttle includes a spring for pressing the throttle valve in a full-closing direction (in the case of a single throttle valve structure) or in a full-opening direction (in the case of a dual throttle valve structure). When abnormality in a stepping motor working as the actuator reduces a valve sustaining torque, the throttle valve is abruptly driven in the full-closing direction or the full-opening direction. This results in an abrupt change of the air intake in the internal combustion engine. Delay in the abnormality detection may cause abrupt acceleration or deceleration.

SUMMARY OF THE INVENTION

One object of the present invention is thus to provide a novel system for detecting an abnormal condition of an actuator used for driving one of dual throttle valves, based on a parameter representing a movement of the throttle valve.

Another object of the invention is to provide a system incorporated in an internal combustion engine with dual throttle valves, for detecting an abnormal condition of an actuator used for driving a second throttle valve and adequately controlling an air intake in the internal combustion engine.

Still another object of the invention is to provide a system incorporated in an internal combustion engine with dual throttle valves, for detecting an abnormal condition of an actuator used for driving a second throttle valve and adequately controlling an amount of fuel injection in the internal combustion engine.

A further object of the invention is to provide a system incorporated in an internal combustion engine with a single throttle valve, for detecting an abnormal condition of an actuator and adequately controlling an air intake in the internal combustion-engine.

The above and other related objects are realized by an abnormality detection device for detecting an abnormal condition of an actuator, which includes:
- a first throttle valve driven in response to operation of an accelerator;
- a second throttle valve disposed in series with the first throttle valve in an air intake conduit and pressed to a full-opening position;
- an operation unit for determining a parameter representing a speed of a certain movement of the second throttle valve in an opening direction; and
- a determination unit for determining that the actuator is under an abnormal condition when the parameter determined shows an impossible value to be realized by the actuator. The parameter may be a rotation speed or an acceleration of the second throttle valve.

The second throttle valve is typically pressed by means of a spring.

The abnormality detection device of the invention may further include an increase detection unit for detecting an increase in an air intake above a predetermined level. In this structure, the determination unit determines that the actuator is under an abnormal condition when the increase detection unit detects an increase in the air intake above the predetermined level while the parameter determined shows an impossible value to be realized by the actuator. This allows the device to determine an abnormal condition of the actuator only when such abnormality substantially affects operation of an internal combustion engine.

In an alternative application, the invention is directed to an air intake control device for regulating an air intake into an internal combustion engine according to operating conditions of the internal combustion engine. The device includes:
- a first throttle valve driven in response to operation of an accelerator;
- a second throttle valve disposed in series with the first throttle valve in an air intake conduit;
- an actuator for driving the second throttle valve;
- an opening control unit for controlling the actuator to regulate an opening of the second throttle valve;
- a pressing unit for pressing the second throttle valve in a predetermined direction;
- an operation unit for determining a parameter representing a speed of a certain movement of the second throttle valve in the predetermined direction;
- a determination unit for determining that the actuator is under an abnormal condition when the parameter determined shows an impossible value to be realized by the actuator;
- an air intake change detection unit for detecting a variation in an air intake over a predetermined range; and
- an air intake control unit for, when the determination unit determines that the actuator is under an abnormal condition and the air intake change detection unit detects the variation in the air intake over the predetermined range, controlling the air intake into the internal combustion engine to compensate for the variation.

In such an air intake control device, the air intake change detection unit may further include a negative pressure detection unit for detecting a manifold negative pressure in the internal combustion engine, and an excessive change detection unit for detecting a variation in the manifold negative pressure over a predetermined value. This structure in which a variation in the air intake is determined according to a change in the manifold negative pressure has excellent responsiveness to realize detection prior to a substantial change in the air intake.

The second throttle valve may be pressed in a full-opening direction.

When the second throttle valve is pressed in the full-opening direction, the operation unit determines a parameter representing a speed of a movement of the second throttle valve in the full-opening direction while the air intake change detection unit detecting an increase in the air intake over the predetermined range and the air intake control unit controlling the air intake into the internal combustion engine by decreasing an opening of a flow path running around the first throttle valve.

This structure keeps the second throttle valve from being abruptly driven in the full-opening direction due to an abnormal condition of the second throttle valve, and thereby effectively prevents an undesirably abrupt increase in the air intake into the internal combustion engine which may cause a variety of troubles.

In still another application, the objects of the invention are realized by a fuel injection control device for regulating an amount of fuel injection of an internal combustion engine. The device includes:
- a first throttle valve driven in response to operation of an accelerator;
- a second throttle valve disposed in series with the first throttle valve in an air intake conduit and pressed in a full-closing direction;
- an actuator for driving the second throttle valve;
- an opening control unit for controlling the actuator according to operating conditions of the internal combustion engine to regulate an opening of the second throttle valve;
- an air intake detection unit for detecting an air intake into the internal combustion engine;
- a fuel injection control unit for controlling an amount of fuel injection corresponding to the air intake detected by the air intake detection unit;
- an operation unit for determining a parameter representing a speed of a movement of the second throttle valve in an opening direction;
- an air intake increase detection unit for detecting an increase in the air intake over a predetermined range;
- a determination unit for determining that the actuator is under an abnormal condition when the parameter determined shows an impossible value to be realized by the actuator; and
- a restriction unit for restricting an increase in the 10 amount of fuel injection by the fuel injection control unit corresponding to an increase in the air intake into the internal combustion engine when the air intake increase detection unit detects the increase in the air intake over the predetermined range while the determination unit determining that the actuator is under an abnormal condition.

In this structure, the air intake detection unit detects a manifold negative pressure in the internal combustion engine, and the air intake increase detection unit detects an increase in the manifold negative pressure over a predetermined value. This allows regulation of the fuel injection prior to a substantial change of the air intake.

The principle of the invention may further be applicable to a single throttle valve structure realized as an air intake control device for driving a throttle valve by means of an actuator to regulate an air intake into an internal combustion engine. The device includes:

- a pressing unit for pressing the throttle valve in a full-closing direction;
- an operation unit for determining a parameter representing a speed of a movement of the throttle valve in the full-closing direction;
- a determination unit for determining that the actuator is under an abnormal condition when the parameter determined shows an impossible value to be realized by the actuator; and
- a forcible air intake unit for continuing an air intake into the internal combustion engine when the determination unit determines that the actuator is under an abnormal condition.

In such a structure, the forcible air intake unit drives an idle speed control valve which is disposed in a flow path running around the throttle valve, in an opening direction or alternatively drives a first idle control valve for ensuring the air intake at a start-up time of the internal combustion engine, in an opening direction.

The invention is also directed to a method of detecting an abnormal condition of an actuator incorporated in a system including a first throttle valve driven in response to operation of an accelerator, a second throttle valve disposed in series with the first throttle valve in an air intake conduit, a pressing unit for pressing the second throttle valve in a full-opening direction, and the actuator for driving the second throttle valve. The method includes the steps of:

- determining a parameter representing a speed of a movement of the second throttle valve in the full-opening direction; and
- determining that the actuator is under an abnormal condition when the parameter determined shows an impossible value to be realized by the actuator.

The invention also pertains to a method of controlling 10 an air intake under an abnormal condition of an actuator. The method generally includes the steps of: driving a first throttle valve in response to operation of an accelerator; driving by means of an actuator a second throttle valve disposed in series with the first throttle valve in an air intake conduit and pressed in a predetermined direction; controlling the actuator according to operating conditions of an internal combustion engine to regulate an opening of the second throttle valve; and controlling an air intake into the internal combustion engine based on openings of the first throttle valve and the second throttle valve. The method further includes the steps of:

- determining a parameter representing a speed of a certain movement of the second throttle valve in the predetermined direction;
- determining that the actuator is under an abnormal condition when the parameter determined shows an impossible value to be realized by the actuator;
- detecting a variation in an air intake over a predetermined range; and
- controlling the air intake into the internal combustion engine to compensate for the change when the actuator is determined to be under an abnormal condition and the variation in the air intake is determined to be over the predetermined range.

The principle of the invention is further applied to a single throttle valve structure as a method of driving by means of an actuator a throttle valve disposed in an air intake conduit of an internal combustion engine and pressed in a full-closing direction so as to control air intake into the internal combustion engine. The method includes the steps of:

- determining a parameter representing a speed of a movement of the throttle valve in the full-closing direction;
- determining that the actuator is under an abnormal condition when the parameter determined shows an impossible value to be realized by the actuator; and
- continuing air intake into the internal combustion engine when the actuator is determined to be under an abnormal condition.

These and other objects, features, aspects, and advantages of the present invention will become more apparent from the following detailed description of the preferred embodiment with the accompanying drawings.

DESCRIPTION OF THE PREFERRED EMBODIMENT

Figure 1:
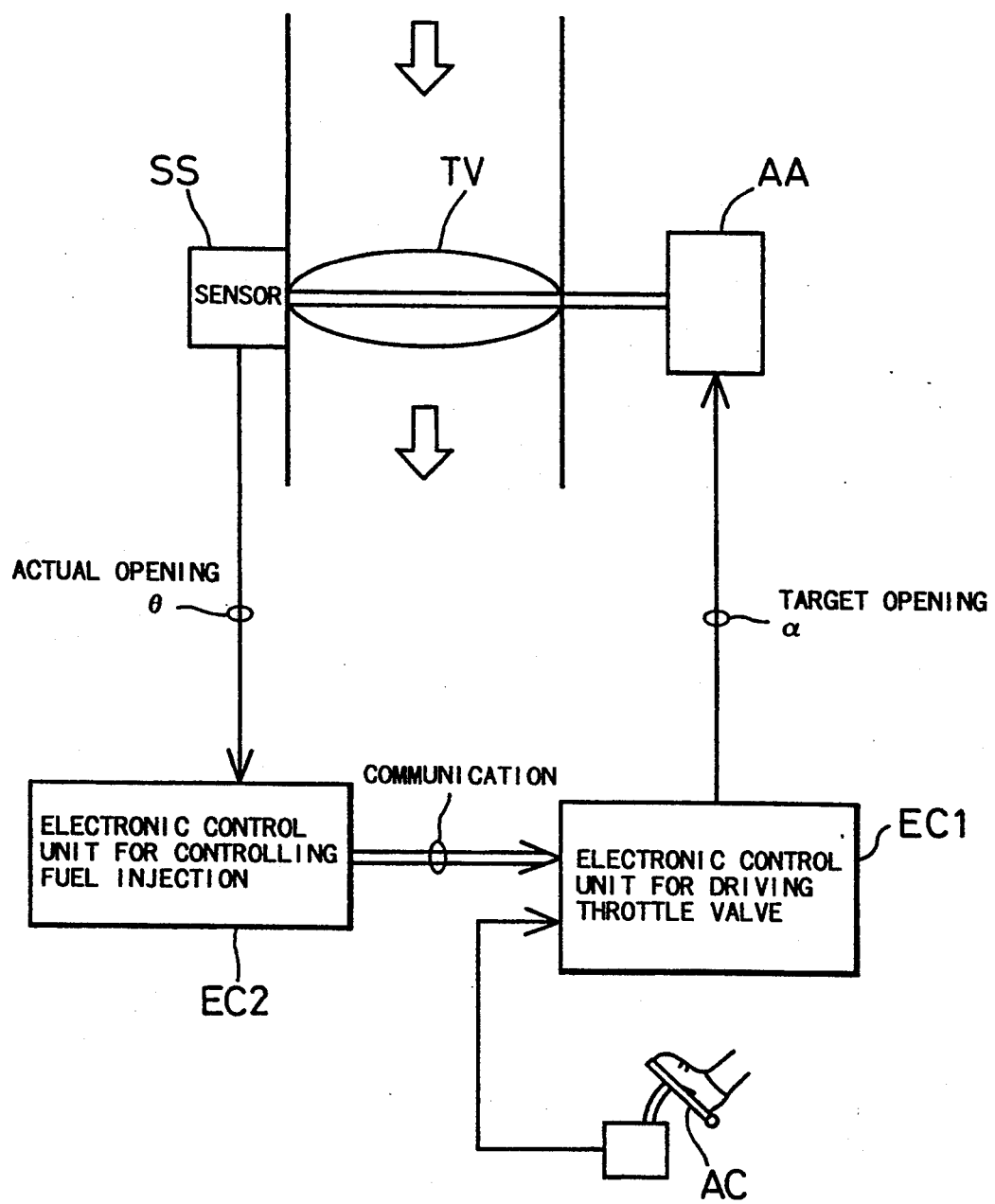
FIG. 1 shows principles of a prior art system.
Figure 2:
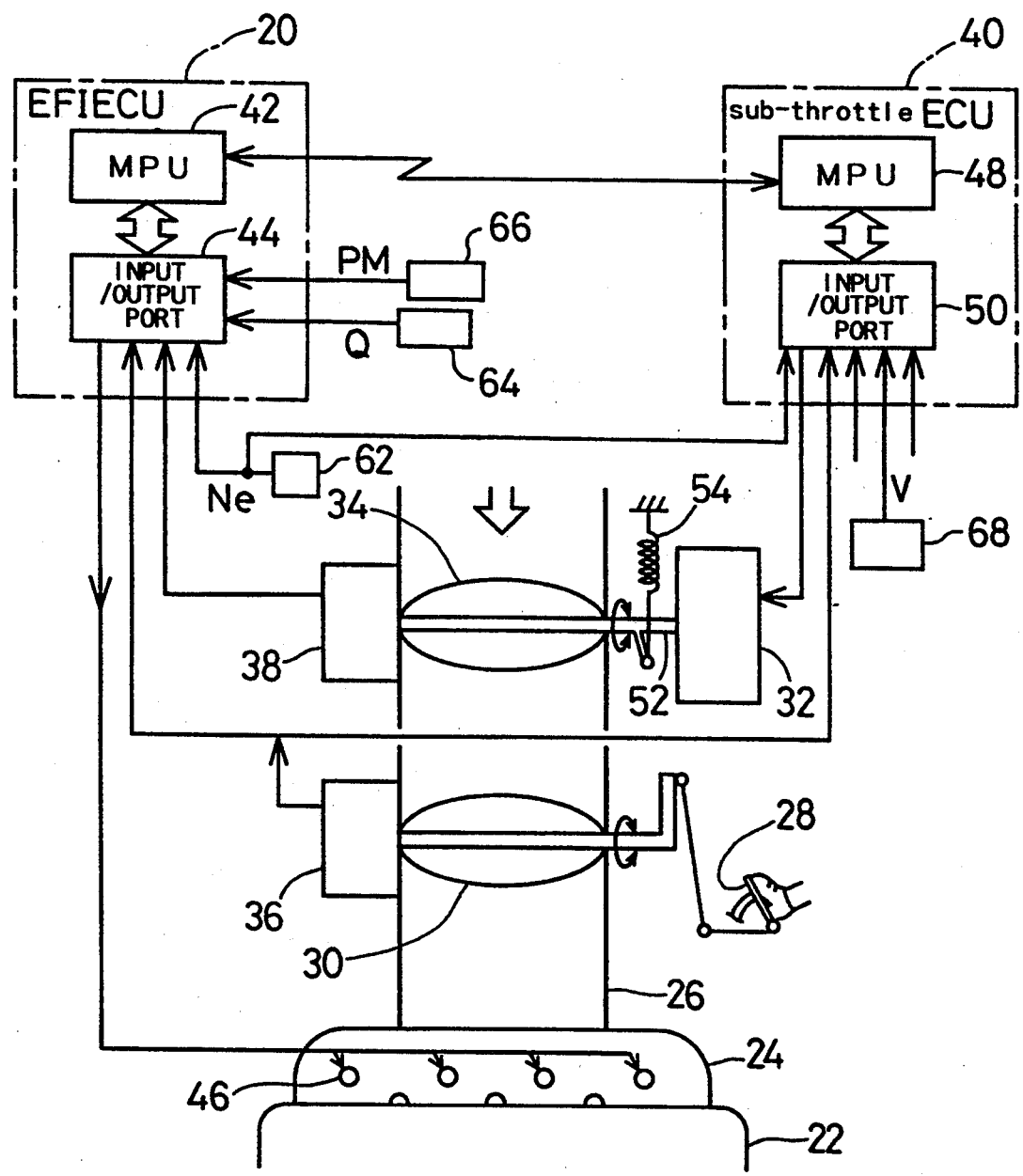
FIG. 2 schematically illustrates a basic structure of a device for detecting an abnormal condition of an actuator as a first embodiment according to the invention.

Structures and functions of the invention will become more apparent through the following description of preferred embodiment according to the invention. FIG. 2 schematically shows a device for detecting abnormality of an actuator and controlling an internal combustion engine as an embodiment of the invention. The device is incorporated in an engine fuel injection electronic control unit (hereinafter referred to as EFIECU) 20 for controlling an amount of fuel injection into an internal combustion engine. A fundamental structure of an air supply system of an engine 22 is described first.

An air supply conduit 26 connecting to an intake manifold 24 of the engine 22 is provided with a main throttle valve 30 having a first opening regulated in connection with an accelerator 28, and a sub-throttle valve 34 having a second opening regulated by a stepping motor 32 functioning as an actuator. A reduction gear (not shown) for gear down rotation of the stepping motor 32 is disposed between the throttle valve 30 and the stepping motor 32. The main throttle valve 30 has a main valve opening sensor 36 for detecting an opening of the main throttle valve 30 whereas the sub-throttle valve 34 includes a sub-valve opening sensor 38. Signals from the opening sensors 36 and 38 are output to a sub-throttle electrical control unit (hereinafter referred to as sub-throttle ECU) 40 and the EFIECU 20.

The EFIECU 20 is a controller for regulating an amount of fuel injection into the engine 22, and includes a 1-chip microprocessor unit (hereinafter referred to as MPU) 42 having conventional elements such as a ROM (read only memory), a RAM (random access memory), and a communication circuit built therein, and an input-/output port 44 functioning as an interface with sensors. The MPU 42 receives through the input/output port 44 a variety of data including an opening $\theta$ of the main throttle valve 30, an engine rotating speed Ne output from a rotation speed sensor 62, an air intake Q sent from an air flowmeter 64, and a manifold negative pressure PM sent from vacuum sensor 66, and an opening TA of the sub-throttle valve 34, and determines and controls a suitable amount of fuel injection based on these data. More concretely, the MPU 42 determines an amount of fuel injection required for the engine 22 and regulates an opening time of fuel injection valves 46 disposed in the intake manifold 24 so as to control the amount of fuel injection.

An actual air intake is determined according to the opening TA of the sub-throttle valve 34 as well as the opening $\theta$ of the main throttle valve 30. The EFIECU 20 receives data representing the opening TA of the sub-throttle valve 34, and increases or decreases an amount of fuel injection in response to movements of the sub-throttle valve 34 and the main throttle valve 30 prior to detection of the air intake Q by the air flowmeter.

The sub-throttle ECU 40 is a controller for regulating the opening TA of the sub-throttle valve 34, and includes, like the EFIECU 20, a 1-chip microprocessor unit (hereinafter referred to as MPU) 48 and an input-/output port 50 functioning as an interface with sensors. The MPU 48 receives via the input/output port 50 a variety of data including the opening $\theta$ of the main throttle valve 30 and the engine rotating speed Ne and a vehicle speed V output from the rotation speed sensor 62 and vehicle speed sensor 68, and determines a target opening of the sub-throttle valve 34 based on these data to drive the stepping motor 32.

Control of the opening of the sub-throttle valve 34 disposed with the main throttle valve 30 in the air intake conduit 26 functions to keep an output of the engine 22 in an appropriate range corresponding to driving conditions of a vehicle and ensure a linearity of the output of the engine 22 with respect to an operating amount of the accelerator 28. Namely, the sub-throttle valve 34 works to restrict an air intake. Under such a condition that the sub-throttle valve 34 is in a full-open position, the air intake is determined according to regulation of the main throttle valve 30. It is thereby preferable to make the sub-throttle valve 34 in the full-open position when any abnormality exists on the stepping motor 32 working as an actuator. A spring 54 is thus disposed on a shaft 52 of the sub-throttle valve 34 to make the sub-throttle valve 34 in the full-open position when a force of the stepping motor 32 deteriorates.

The MPU 48 of the sub-throttle ECU 40 has a serial communication port connecting to a serial communication port of the MPU 42 of the EFIECU 20, so that the MPUs 48 and 42 are intercommunicable. The MPU 48 of the sub-throttle ECU 40 receives data representing the opening TA of the sub-throttle valve 34 communicated from the MPU 42, determines whether the opening TA of the sub-throttle valve 34 corresponds to the opening $\theta$ of the main throttle valve 30 or the target opening set according to the rotation speed Ne of the engine 22, and executes feed-back control to make the opening TA equal to the opening $\theta$ or the target opening.

Figure 3:
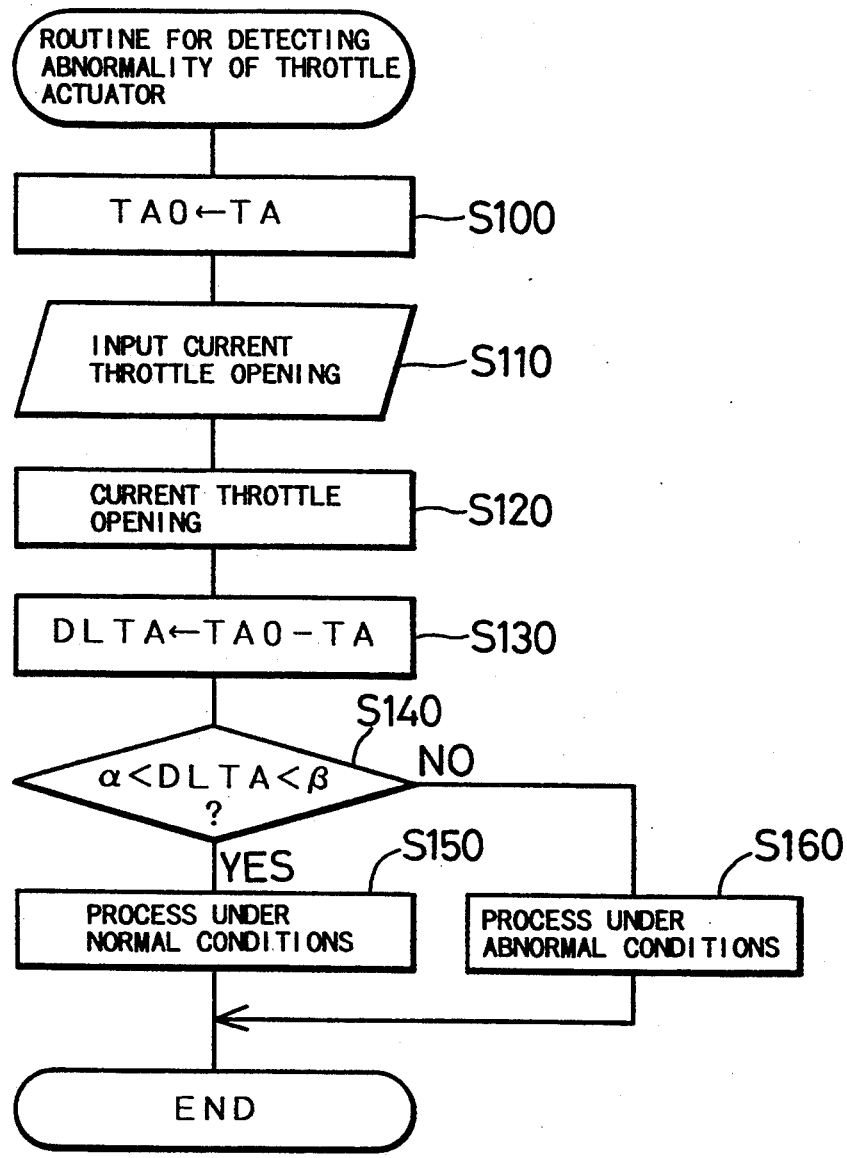
FIG. 3 is a flowchart showing a routine of detecting abnormality of a throttle actuator executed by an EFIECU 20 in the first embodiment.

FIG. 3 is a flowchart showing a routine of detecting abnormality of a throttle actuator executed by the EFIECU 20 thus constructed. This routine is repeatedly executed as an interruption routine activated at every 8 millisecond. At a first step S100, a value of the opening TA of the sub-throttle opening 34 read in a preceding cycle is stored as a previous value TA0. An actual opening of the sub-throttle valve 34 is input based on a signal from the sub-valve opening sensor 38 at step S110, and stored as a current opening TA at step S120.

After determining a difference DLTA between the previous opening TA0 and the current opening TA at step S130, the EFIECU 20 determines whether the difference DLTA is in a predetermined range between an upper limit $\beta$ and a lower limit $\alpha$ at step S140. The sub-throttle valve 34 is driven to rotate both in a normal direction and in a reverse direction by the stepping motor 32. There is an upper limit set for the rotation speed of the stepping motor 32. The difference DLTA is accordingly in the predetermined range under normal operating conditions with the stepping motor 32. When the difference DLTA is in the predetermined range, it is determined that no abnormality exists in a driving system of the sub-throttle valve 34 and the program proceeds to step S150 at which a standard process or a process under normal operating conditions is executed. In this embodiment, the driving speed of the sub-throttle valve 34 by the stepping motor 32 is approximately one half that by the spring 54, and is thus easily discriminated from the latter.

Figure 10:
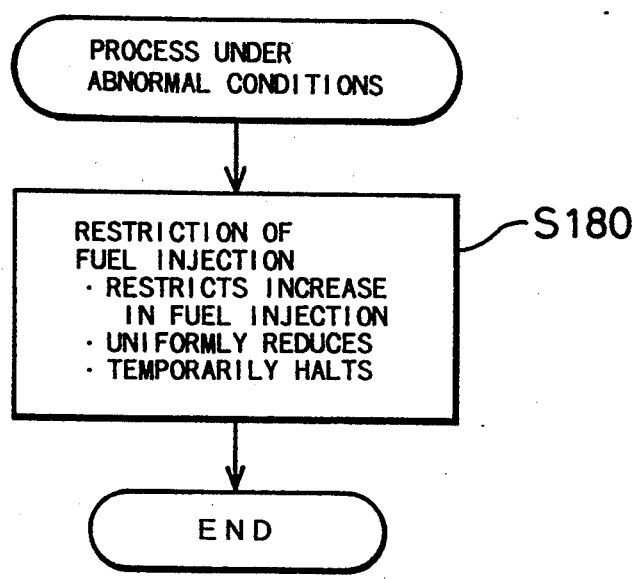
FIG. 10 is a flowchart showing an example of processes taken under an abnormal condition.
Figure 11:
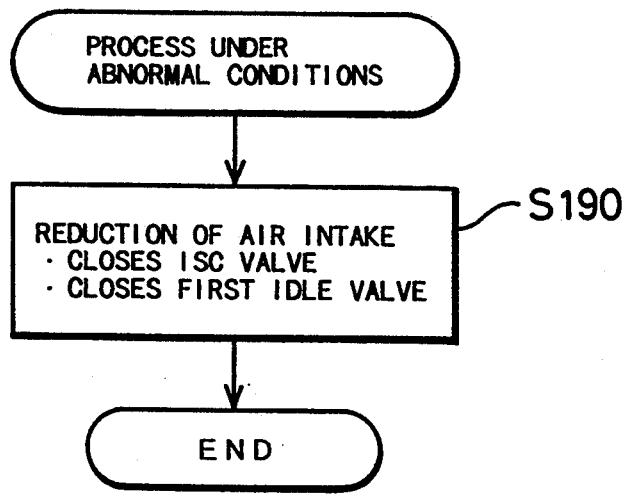
FIG. 11 is a flowchart showing another example of processes taken under an abnormal condition.

Step-out due to an excessive loading may temporarily reduce a torque which the stepping motor 32 holds. In this case, the sub-throttle valve 34 is abruptly driven in a full-opening direction by a pressing force of the spring 54, and the difference DLTA is made out of the predetermined range between the upper and lower limits $\beta$ and $\alpha$. Such a deviation of the difference DLTA from the predetermined range is also found when damage of a reduction gear causes racing of the stepping motor 32 or when the sub-valve opening sensor 38 for detecting the opening of the sub-throttle valve 34 malfunctions. When the difference DLTA is out of the predetermined range between $\beta$ and $\alpha$, it is determined that some abnormality exists in the driving system of the sub-throttle valve 34 and the program goes to step S160 at which a predetermined process under an abnormal condition is implemented.

when it is determined that the driving system of the sub-throttle valve 34 is abnormal, a fuel injection restriction process may be executed as shown at step S180 in the flowchart of FIG. 10. Restriction of fuel injection may be implemented by limiting an increase in fuel injection corresponding to an increase in an air intake due to abrupt opening of the sub-throttle valve 34, uniformly reducing the amount of fuel injection, or temporarily halting the fuel injection. When abnormality of the actuator is detected, an air intake reduction process may alternatively be executed as shown at step S190 in the flowchart of FIG. 11. Reduction of an air intake may be implemented by closing an idle speed control valve (not shown in FIG. 2) or a first idle valve (not shown in FIG. 2). In a system having a separate actuator for driving the main throttle valve 30, the main throttle valve 30 may be driven to compensate for an abrupt movement of the sub-throttle valve 34 in an opening direction.

After executing step S150 or S160, the program goes to 'END' to exit from the routine.

As described above, the device of the first embodiment is realized as the EFIECU 20 to detect an abnormal condition of the actuator irrespective of the target opening of the sub-throttle valve 34 determined by the sub-throttle ECU 40. In a dual throttle valve structure where the sub-throttle valve 34 is pressed in the full-opening direction, abnormality of the actuator, for example, step-out of the stepping motor 32, can be detected within a very short time period without being affected by abnormal communication between ECUs. The EFIECU 20 detects abnormality of the actuator and effectively controls an output of the engine 22 by regulating the air intake or the amount of fuel injection so as to prevent an undesirable overrun of the engine 22. The EFIECU 20 may also control an ignition timing for reduction of an engine torque. In a preferable structure, abnormality of the sub-throttle valve 34 or its driving system is displayed on an instrument panel or the like to give an alarm to a driver.

Figure 4:
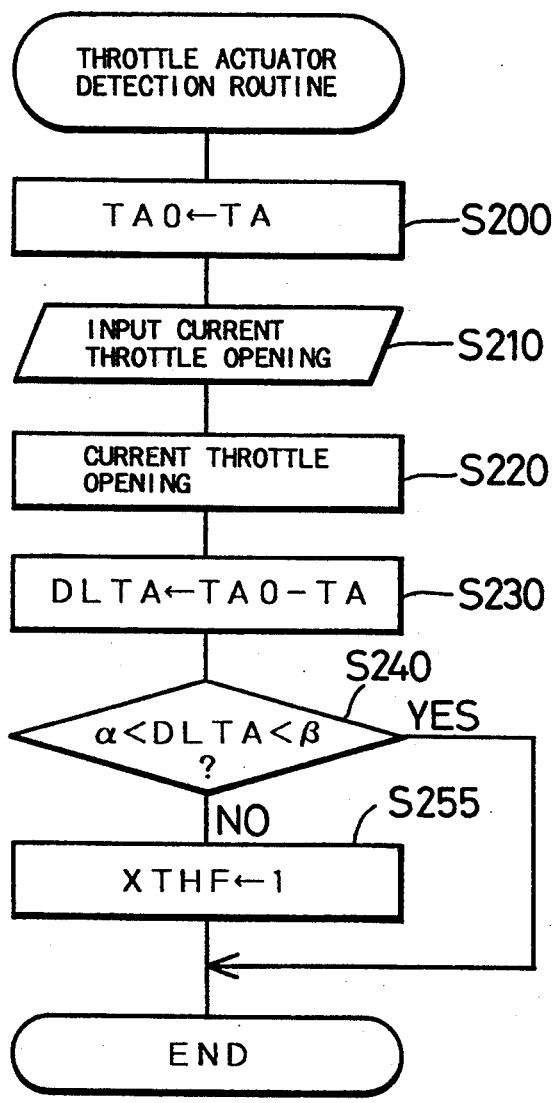
FIG. 4 is a flowchart showing a throttle actuator detection routine in a second embodiment according to the invention.
Figure 5:
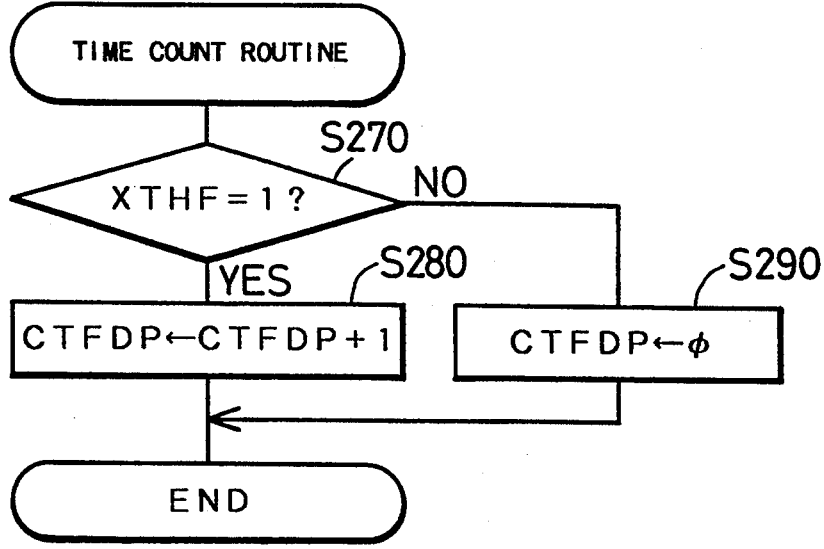
FIG. 5 is a flowchart showing a time counting routine in the second embodiment.
Figure 6:
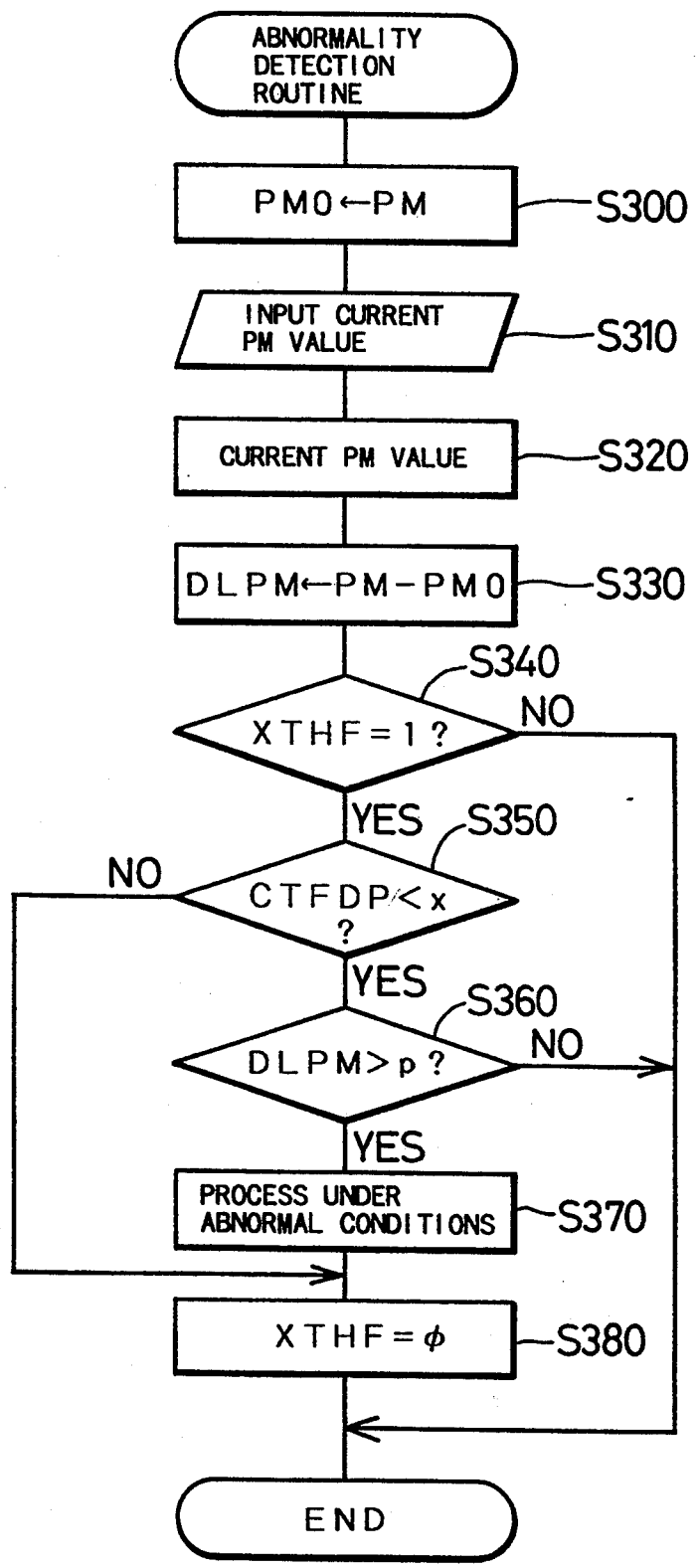
FIG. 6 is a flowchart showing an abnormality detection routine in the second embodiment.

A device for detecting abnormality of a throttle valve and controlling an air intake in a second embodiment has a hardware structure similar to that of the first embodiment. In the second embodiment, processes executed by the EFIECU 20 are different from those of the first embodiment. FIGS. 4 through 6 are flowcharts showing processes executed by the EFIECU 20.

A throttle actuator detection routine shown in the flowchart of FIG. 4 is substantially similar to the routine shown in the flowchart of FIG. 2, and processes executed at steps S200 through S240 in FIG. 4 are the same as those at steps S100 through S140 in FIG. 2. In the routine of FIG. 4, only when a difference DLTA representing a variation in the opening of the sub-throttle valve 34 is out of a predetermined range between upper and lower limits $\beta 0$ and $\alpha$ representing a normal condition of the sub-throttle valve 34, it is determined that some abnormality may exist and the program goes to step S255 at which a flag XTHF is set to equal to one.

A time count routine shown in the flowchart of FIG. 5 is an interruption routine executed independently of the routine of FIG. 4. At step S270, it is determined whether the flag XTHF is equal to one. When XTHF is equal to one, the program goes to step S280 at which a value on a counter CTFDP is incremented by one. When XTHF is not equal to one, on the other hand, the program goes to step S290 at which the counter CTFDP is reset to zero. A time period while the variation in the opening of the sub-throttle valve 34 is out of the predetermined range between the upper and lower limits $\beta$ and $\alpha$ is counted by incrementing the value on the counter CTFDP in the interruption routine of FIG. 5.

A process of detecting an abnormal condition of a driving system of the sub-throttle valve 34 is described according to an abnormality detection routine shown in The flowchart of FIG. 6. This routine is activated as an interruption routine at every 32 milliseconds. At step S300, a value of a manifold negative pressure PM read in a precious cycle of the routine is set as a previous negative pressure PM0. The program then proceeds to step S310 at which a current manifold negative pressure is read, and then to step S320 at which the current pressure is stored as a value of a current negative pressure PM. At step S330, a difference DLPM between the previous negative pressure PM0 and the current negative pressure PM is determined.

The program then goes to step S340 at which it is determined whether the flag XTHF is equal to one, to step S350 at which the value on the counter CTFDP is compared with a predetermined value x, and to step S360 at which the difference DLPM is compared with a predetermined value p. When all the conditions are fulfilled at steps S340 through S360, that is, when a variation in the opening of the sub-throttle valve 34 out of the predetermined range between the upper and lower limits $\beta$ and $\alpha$ continues within a predetermined time period while the manifold negative pressure changes over a predetermined level, it is determined that abnormality exists in the driving system of the sub-throttle valve 34 and the program goes to step S370 at which a process under an abnormal condition is implemented. Typical examples of such abnormality compensation processes include restriction, reduction or temporary cessation of fuel injection corresponding to an increase in an air intake due to abrupt opening of the sub-throttle valve 34 or reduction of an air intake as described above in the first embodiment. After execution of step S370, the program goes to step S380 at which a flag XTHF is set to equal to zero and goes to 'END' to exit from the routine.

When the flag XTHF is not equal to one at step S340 or when the difference DLPM in the manifold negative pressure is not greater than the predetermined value p at step S360, no process is required and the program goes to 'END' to exit from the routine. When the value on the counter CTFDP is not less than the predetermined value x at step S350, it is determined that abnormality in the sub-throttle valve 34 does not substantially affect operation of the vehicle and the program proceeds to step S380 at which the flag XTHF is reset to zero. The program then goes to 'END' to exit from the routine.

The device of the second embodiment described above is realized as the EFIECU 20 as that of the first embodiment, and effectively detects abnormality of the driving system of the sub-throttle valve 34 without the target opening of the sub-throttle valve 34 determined by the sub-throttle ECU 40. In the improved structure of the second embodiment, a required process under an abnormal condition is not implemented only according to a variation in the moving speed of the sub-throttle valve 34 out of a predetermined range for normal operation. The abnormality process is executed only when the manifold negative pressure drastically changes and the air intake abruptly increases. Even when the sub-throttle valve 34 is abruptly driven by the spring 54 in a full-opening direction, for example, due to step-out of the stepping motor 32, the amount of fuel injection is not reduced unless the air intake abruptly increases. In a range where the opening of the sub-throttle valve 34 is greater than the opening of the main throttle valve 30

(for example, a range near a full-closed position of the main throttle valve 30), the air intake does not significantly increase even when the sub-throttle valve 34 is abruptly driven in the full-opening direction.

Figure 7:
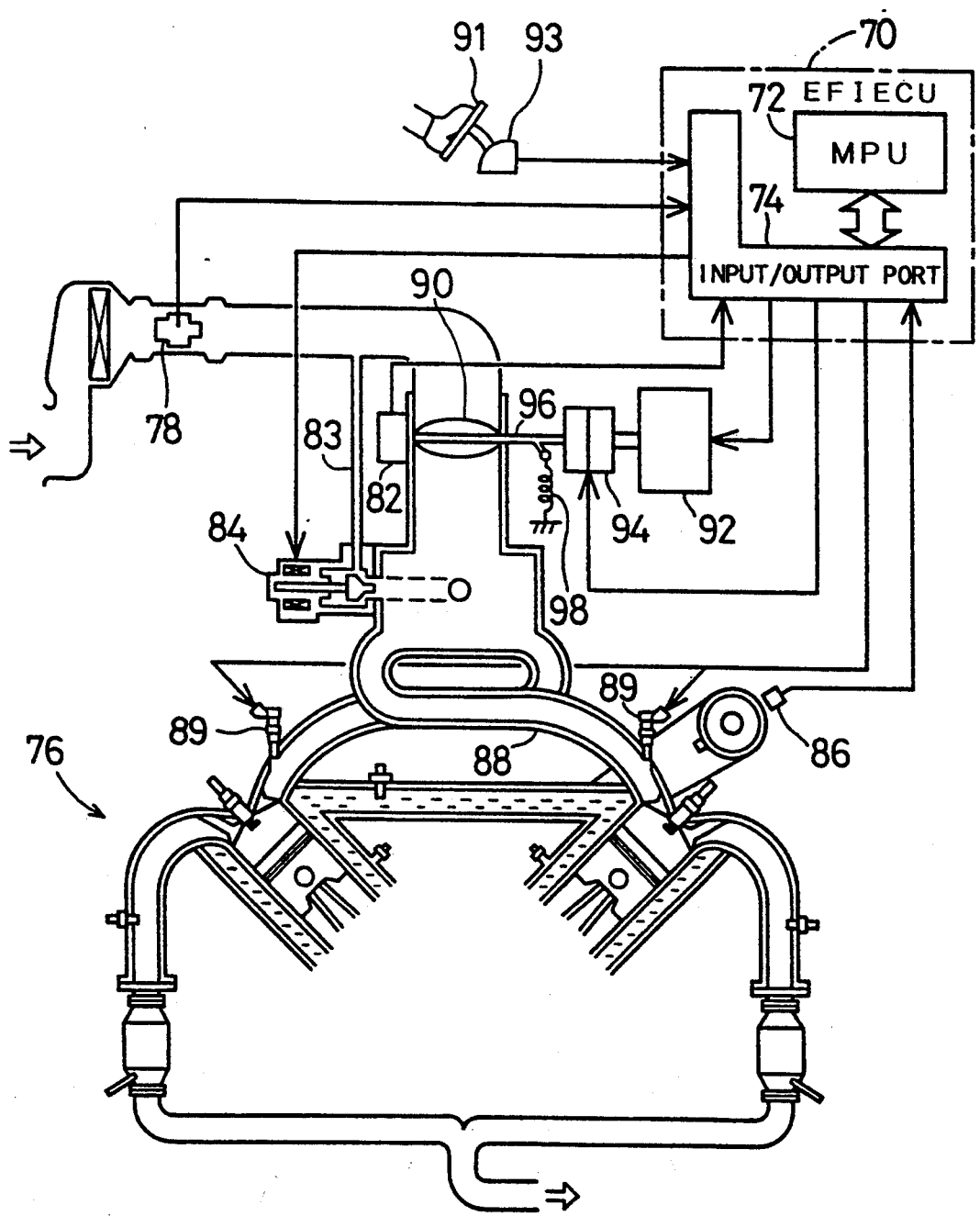
FIG. 7 schematically shows a structure of an abnormality detection device as a third embodiment according to the invention.

The principle of the invention is also applicable to an electronically controlled single throttle valve structure. FIG. 7 schematically shows a device for detecting an abnormal condition of an actuator and controlling an internal combustion engine as a third embodiment according to the invention. The device of the third embodiment is also realized as an engine fuel injection electronic control unit (hereinafter referred to as EFIECU) 70.

The EFIECU 70 includes a microprocessor unit (hereinafter referred to as MPU) 72 having conventional elements such as a ROM and a RAM built therein, and an input/output port 74 functioning as an interface with sensors or actuators. The 25 input/output port 74 is connected to an air intake sensor 78 disposed upstream in an air intake system of an engine 76, a throttle sensor 82 for detecting an opening of a throttle valve 90, an idle speed control valve 84 disposed in an air intake conduit 83 running around the throttle valve 90, a rotation speed sensor 86 for detecting a rotation speed of a crank shaft, fuel injection valves 89 disposed in an intake manifold 88 of the engine 76, an accelerator sensor 91 for detecting an accelerator pedal 93 position, a DC motor 92 for adjusting the opening of the throttle valve 90, and an electromagnetic clutch 94 disposed between the DC motor 92 and the throttle valve 90. The EFIECU 70 controls fuel injection basis on the engine condition and a throttle opening according to the pedal position detected by accelerator sensor 93.

When some abnormality is detected in the DC motor 92 working as an actuator, the electromagnetic clutch 94 is activated to cut off a mechanical connection with the throttle valve 90, which is then driven in a full-closing direction by means of a spring 98 attached to a shaft 96 of the throttle valve 90 for safety. Elements other than sensors required for abnormality detection are omitted in the drawing of FIG. 7.

Figure 8:
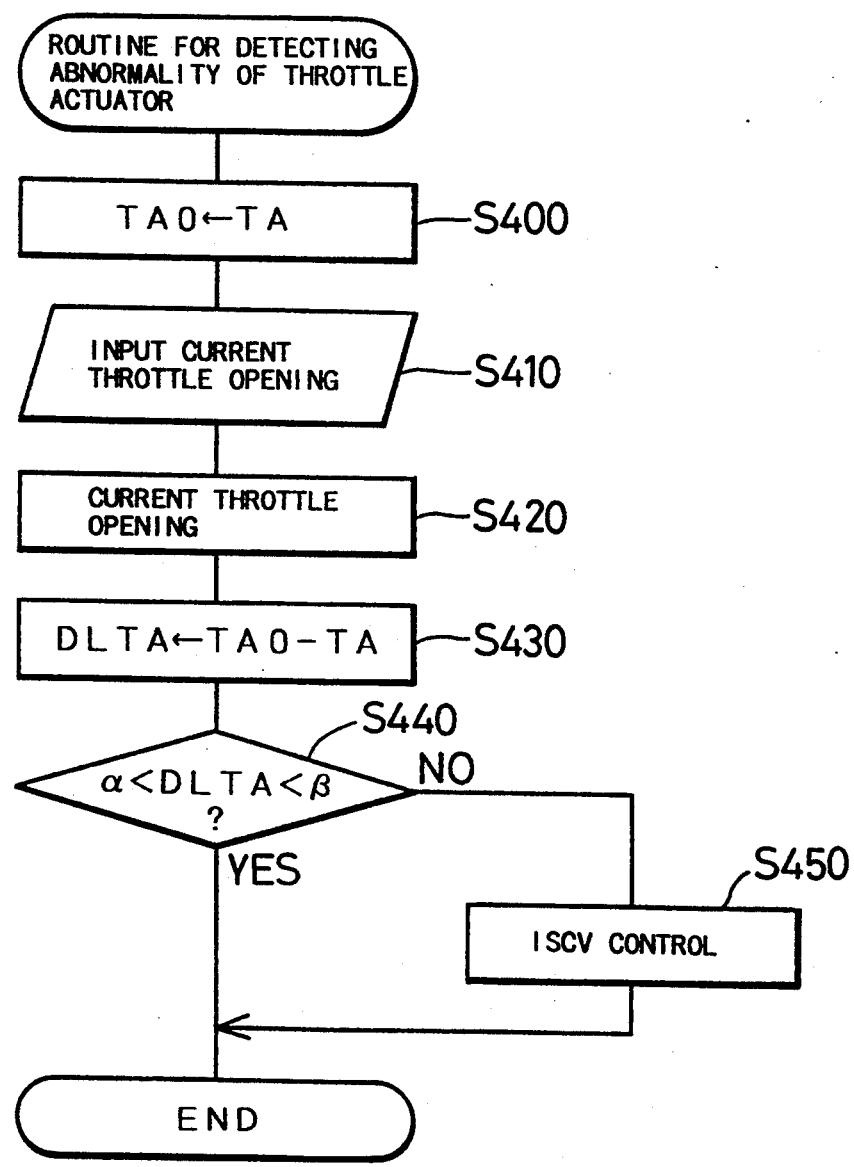
FIG. 8 is a flowchart showing a routine of detecting abnormality of a throttle actuator executed by an EFIECU 70 in the third embodiment FIG. 9 schematically shows installation of an abnormality detection device 500 as a fourth embodiment of the invention.

The EFIECU 70 thus constructed repeatedly executes a routine of detecting abnormality of a throttle actuator shown in the flowchart of FIG. 8 as an interruption routine activated at every 8 milliseconds as well as other routines including a fuel injection control routine (not shown). When the program enters the routine, processes at steps S400 through S440 are executed in the same manner as those at steps S100 through S140 shown in the flowchart of FIG. 3 according to the first embodiment. At step S440, it is determined whether a difference DLTA representing a variation in the opening of the throttle valve 90 over a predetermined time is out of a predetermined range between upper and lower limits $\beta$ and $\alpha$ for normal operation by the DC motor 92.

When the difference DLTA is within the predetermined range between the upper and lower limits $\beta$ and $\alpha$ at step S440, no process is required in this routine and the program goes to 'END' to exit from the routine. When DLTA is out of the predetermined range at step S440, on the other hand, it is determined that the throttle valve 90 is abruptly driven in a full-closing direction and an air intake abruptly decreases, the program proceeds to step S450 at which an ISCV control is implemented, that is, the idle speed control valve 84 is driven in a full-opening direction. The program then goes to 'END' to exit from the routine.

In the third embodiment thus constructed, the EFIECU 70 for controlling the amount of fuel injection into the engine 76 effectively detects abnormality in a driving system of the throttle valve 90. In this structure, the throttle valve 90 is pressed in a full-closing direction by the spring 98 for safety. When the throttle valve 90 is abruptly closed due to malfunction or abnormal operation of the electromagnetic clutch 94, the idle speed control valve 84 is opened to ensure an appropriate air intake and thereby prevent an output of the engine 76 from abruptly decreasing. This structure protects a driver from uncomfortable feeling and effectively prevents a slip of the vehicle due to engine braking in a case of abrupt decrease in the engine output on a downward slope.

Figure 9:
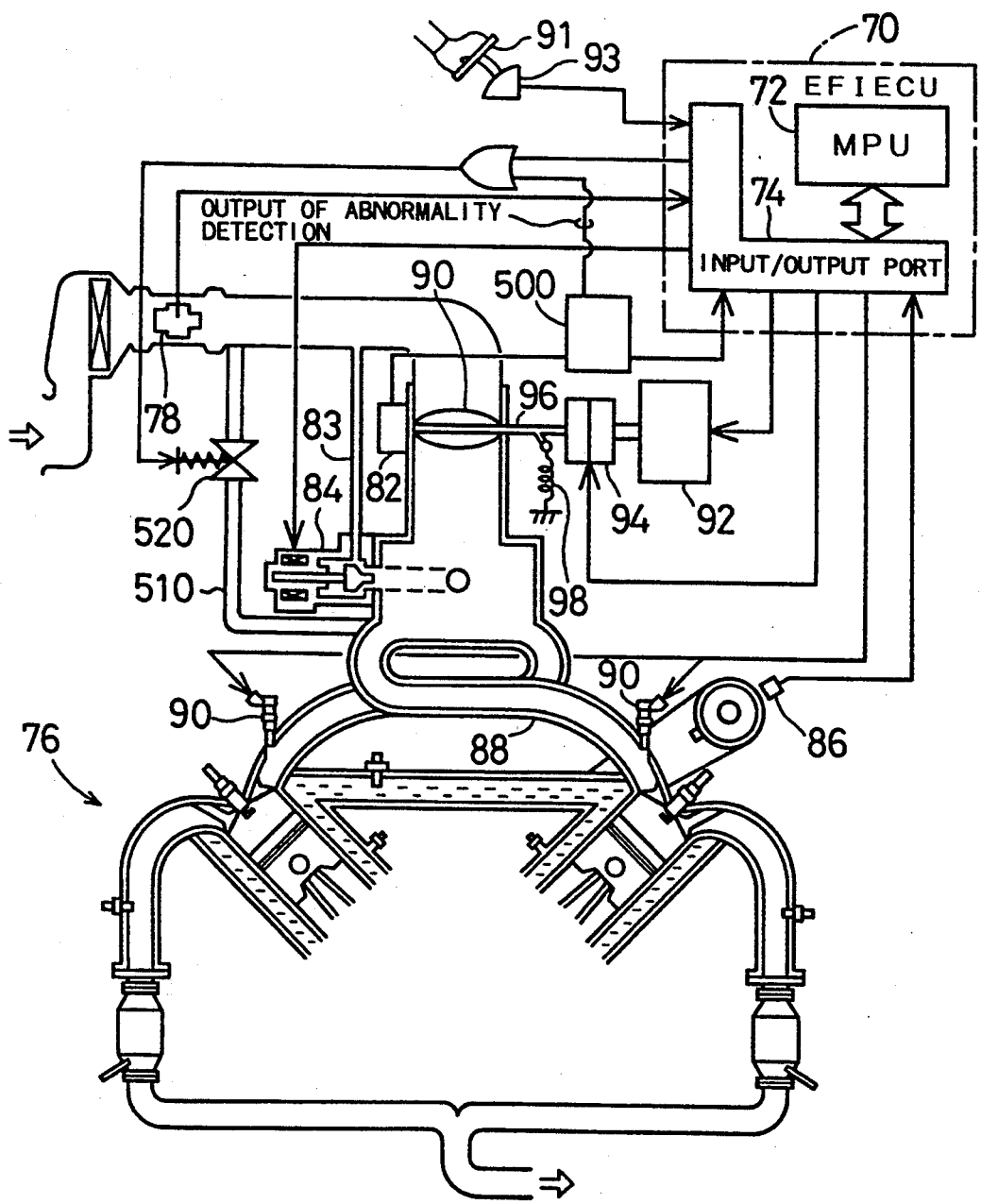
Figure 9:
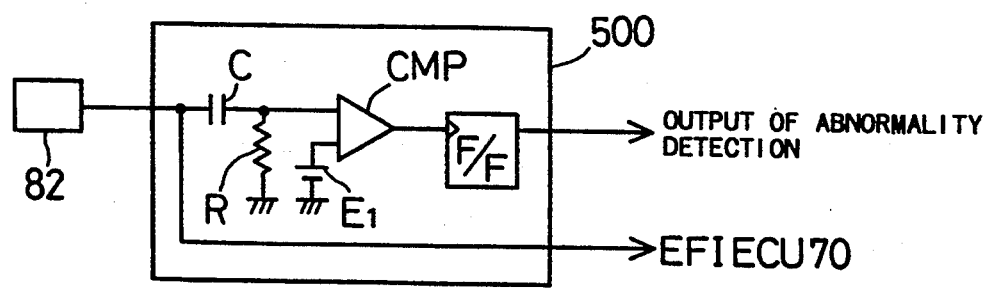

FIG. 9 schematically shows a device 500 for detecting abnormality, as a fourth embodiment according to the invention, which is constructed separately from the EFIECU 70 in the structure of the third embodiment shown in FIG. 7. The device 500 is installed in a half way of a signal cable connecting the throttle sensor 82 to the EFIECU 70. The device 500 includes a differential circuit having a capacitor C and a resistor R for differentiating signals sent from the throttle sensor 82, a comparator CMP for comparing differentiated signals with a reference voltage El, and a flip-flop F/F set according to an output of the comparator CMP. Signals from the throttle sensor 82 are also output to the input/output port 74 of the EFIECU 70.

When a signal output from the throttle sensor 82 corresponding to an opening of the throttle valve 90 is abruptly changed, the device 500 detects such an abrupt change through comparison in the comparator CMP and sets the change in the flip-flop F/F. In other words, when the throttle sensor 82 outputs a signal corresponding to an abnormal movement of the throttle valve 90, the device 500 sets the abnormality as an output in the flip-flop F/F so as to increase an air intake. The engine 76 includes a second intake conduit 510 exclusively used for first idling and a first idle control valve 520 for opening and closing the second intake conduit 510 as well as the air intake conduit 83 for the idle speed control. The first idle control valve 520 is constructed as a solenoid valve which opens according to a logical sum of an opening/closing signal from the EFIECU 70 and an output from the device 500. When the throttle valve 90 is abruptly driven in a full-closing direction, the device 500 effectively increases the air intake. This structure gives an alarm of an abnormal condition to a driver and increases the air intake in a case of an abrupt change of the opening of the throttle valve 90.

Since there may be many other changes, modifications, and alterations without departing from the scope or spirit of essential characteristics of the invention, it is clearly understood that the above embodiments are only illustrative and not restrictive in any sense. The spirit and scope of the present invention is limited only by the terms of the appended claims.

What is claimed is:

1. An abnormality detection device for detecting an abnormal condition of an actuator, said device comprising:
   a first throttle valve driven in response to operation of an accelerator;
   a second throttle valve disposed in series with said first throttle valve in an air intake conduit, driven by said actuator and pressed to a full-opening position;

operation means for determining a parameter representing a speed of a certain movement of said second throttle valve in an opening direction; and determination means for determining that said actuator is under an abnormal condition when said parameter determined shows an impossible value to be realized by said actuator.

2. An abnormality detection device in accordance with claim 1, said device further comprising spring means for pressing said second throttle valve.

3. An abnormality detection device in accordance with claim 1, said device further comprising increase detection means for detecting an increase in an air intake above a predetermined level;

wherein said determination means determines that said actuator is under an abnormal condition when said increase detection means detects an increase in the air intake above said predetermined level while said parameter determined shows an impossible value to be realized by said actuator.

4. An air intake control device for regulating an air intake into an internal combustion engine according to operating conditions of said internal combustion engine, said device comprising:

a first throttle valve driven in response to operation of an accelerator;

a second throttle valve disposed in series with said first throttle valve in an air intake conduit;

an actuator for driving said second throttle valve;

opening control means for controlling said actuator to regulate an opening of said second throttle valve;

pressing means for pressing said second throttle valve in a predetermined direction;

operation means for determining a parameter representing a speed of a certain movement of said second throttle valve in said predetermined direction;

determination means for determining that said actuator is under an abnormal condition when said parameter determined shows an impossible value to be realized by said actuator;

air intake change detection means for detecting a variation in an air intake over a predetermined range; and air intake control means for, when said determination means determines that said actuator is under an abnormal condition and said air intake change detection means detects the variation in the air intake over said predetermined range, controlling the air intake into said internal combustion engine to compensate for said change.

5. An air intake control device in accordance with claim 4, wherein said air intake change detection means further comprises:

negative pressure detection means for detecting a manifold negative pressure in said internal combustion engine; and excessive change detection means for detecting a change in the manifold negative pressure over a predetermined value.

6. An air intake control device in accordance with claim 4, wherein said pressing means presses said second throttle valve in a full-opening direction;

said operation means determining a parameter representing a speed of a movement of said second throttle valve in said full-opening direction;

said air intake change detection means detecting an increase in an air intake over said predetermined range; and said air intake control means controlling the air intake into the internal combustion engine by decreasing an opening of a flow path running around said first throttle valve.

7. An air intake control device for driving a throttle valve by means of an actuator to regulate an air intake into an internal combustion engine, said device comprising:

pressing means for pressing said throttle valve in a full-closing direction;

operation means for determining a parameter representing a speed of a movement of said throttle valve in said full-closing direction;

determination means for determining that said actuator is under an abnormal condition when said parameter determined shows an impossible value to be realized by said actuator; and forcible air intake means for continuing an air intake into said internal combustion engine when said determination means determines that said actuator is under an abnormal condition.

8. An air intake control device in accordance with claim 7, wherein said forcible air intake means drives an idle speed control valve, which is disposed in a flow path running around said throttle valve, in an opening direction.

9. An air intake control device in accordance with claim 7, wherein said forcible air intake means drives a first idle control valve for ensuring an air intake at a starting-up time of said internal combustion engine, in an opening direction.

10. A method of detecting an abnormal condition of an actuator incorporated in a system comprising a first throttle valve driven in response to operation of an accelerator, a second throttle valve disposed in series with said first throttle valve in an air intake conduit, pressing means for pressing said second throttle valve in a full-opening direction, and said actuator for driving said second throttle valve, said method comprising the steps of:

determining a parameter representing a speed of a movement of said second throttle valve in said full-opening direction; and determining that said actuator is under an abnormal condition when said parameter determined shows an impossible value to be realized by said actuator.

11. A method of driving a first throttle valve in response to operation of an accelerator, driving by means of an actuator a second throttle valve disposed in series with said first throttle valve in an air intake conduit and pressed in a predetermined direction, controlling said actuator according to operating conditions of an internal combustion engine to regulate an opening of said second throttle valve, and controlling an air intake into said internal combustion engine based on openings of said first throttle valve and said second throttle valve, said method comprising the steps of:

determining a parameter representing a speed of a certain movement of said second throttle valve in said predetermined direction;

determining that said actuator is under an abnormal condition when said parameter determined shows an impossible value to be realized by said actuator;

detecting a variation in an air intake over a predetermined range; and controlling the air intake into said internal combustion engine to compensate for the change when said actuator is determined to be under an abnormal condition and the variation in the air intake is determined to be over said predetermined range.

12. A method of driving by means of an actuator a throttle valve disposed in an air intake conduit of an internal combustion engine and pressed in a full-closing direction so as to control an air intake into said internal combustion engine, said method comprising the steps of:

determining a parameter representing a speed of a movement of said throttle valve in said full-closing direction;

determining that said actuator is under an abnormal condition when said parameter determined shows an impossible value to be realized by said actuator; and continuing an air intake into said internal combustion engine when said actuator is determined to be under an abnormal condition.

* * * * *